Nov. 7, 1950  B. D. PILE ET AL  2,529,416
APPARATUS AND PROCESS FOR PRODUCING CAPSULES
Filed July 1, 1948  5 Sheets-Sheet 1

INVENTORS.
Benjamin D. Pile
Archie H. McCallum
BY
ATTORNEYS.

Nov. 7, 1950     B. D. PILE ET AL     2,529,416
APPARATUS AND PROCESS FOR PRODUCING CAPSULES
Filed July 1, 1948     5 Sheets-Sheet 2

INVENTORS.
Benjamin D. Pile
Archie H. McCallum
BY
ATTORNEYS.

Nov. 7, 1950     B. D. PILE ET AL     2,529,416
APPARATUS AND PROCESS FOR PRODUCING CAPSULES
Filed July 1, 1948     5 Sheets-Sheet 4

INVENTORS.
Benjamin D. Pile
Archie H. McCallum
ATTORNEYS.

Nov. 7, 1950 B. D. PILE ET AL 2,529,416
APPARATUS AND PROCESS FOR PRODUCING CAPSULES
Filed July 1, 1948 5 Sheets-Sheet 5

INVENTORS.
Benjamin D. Pile
Archie H. McCallum
BY Lancaster, Allan & Rommel
ATTORNEYS.

Patented Nov. 7, 1950

2,529,416

UNITED STATES PATENT OFFICE 2,529,416

APPARATUS AND PROCESS FOR PRODUCING CAPSULES

Benjamin D. Pile, Alexandria, Va., and Archie H. McCallum, Peoria, Ill.

Application July 1, 1948, Serial No. 36,496

20 Claims. (Cl. 18—5)

1

This invention relates to apparatus and process for producing capsules particularly of the pliable, seamless type containing a filler in a fluid or semifluid state. In general the present invention is similar to that in our application Serial No. 786,354 filed November 17, 1947 for improvements in the Process and Apparatus for Producing Capsules.

As in our earlier application the capsule machine includes a capsule nozzle into which warm capsule forming material and fluid or semifluid filling ingredients are fed in overlapping cycles so as to produce filled capsules at regular timed intervals. Also such formed capsules are dropped into a cooling chamber containing a liquid coolant, but the present improved apparatus and process deals mainly with the treatment of the formed capsule after it emerges from the nozzle.

One of the principal objects of our invention is to provide improved apparatus and process for the manufacture of uniform thin walled seamless capsules containing ingredients such as fluids and semifluids in which the control of the density of the ingredient in relation to the shell material is unnecessary as in our application referred to above.

Another object is to provide in the apparatus a method of producing oval shaped seamless capsules as well as other shapes.

Another object is to provide in the apparatus a means of varying the size of the capsules without changing any part of the apparatus. For example small capsules can be made spherical while larger capsules would be elongated to accommodate the greater size.

With the above objects in view it will be noted that the operation of the pumps and the nozzle is the same as disclosed in our earlier application. The gelatin solution mixture is the same as that covered in the said earler application; also the operating temperature. While not so critical, the density of said receiving solution should be adjusted to a value near that of the combined mass of the shell material and the ingredient for best operation, the reason being that if the capsule mass is much heavier than the receiving solution it will tend to flatten out before it is operated upon in accordance with the present improved process.

In accordance with the present invention we provide an endless conveyor carrying radially apertured cylindrical containers, or cylinders, at spaced intervals which are open at the top for successively receiving capsules as they are formed by the nozzle. Each cylinder is provided with a longitudinal opening thru which the capsule is deposited and a closure member is hinged thereto which is swung to closed position and the closed container is rotated as it descends with the conveyor thru the fluid coolant in the receiving chamber. The level of the receiving solution with respect to the cylinder as it receives the formed capsule should be such that the closed cylinder projects above the surface approximately one-fourth of its outside diameter; this permits the closure of the cylinder over the mass without pinching or cutting off part of the capsule. After the cylinder is closed the small radial holes permit the escape of any entrapped air. The surface tension of the gelatin prevents the gelatin from entering such small holes. Due to the fact that the cylinder is coated with the coolant fluid the formed capsule does not come into actual contact with the inner walls of the cylinder either when it is open or closed; this coating merely provides a frictional skin effect so that the capsule will be caused to rotate with the cylinder and its shape accordingly is influenced by this skin coating on the cylinder wall.

In this improved apparatus it has been found that the temperature of the receiving bath need not be lower than 60 degrees Fahrenheit. This is a wide departure from that of the machine as disclosed in said earlier application, the metal cylinders being good conductors, transfer the heat from the capsule mass more rapidly than if the capsules were in contact with oil alone. With a lower temperature the capsules seem to gel before they are in the stage of rotation in the cylinder.

Further objects, details and advantages of our improved apparatus and process will appear in the following detailed description of a highly satisfactory embodiment of our machine for producing such capsules, in accordance with our invention, supplemented by the accompanying drawings, forming a part of the specification.

In setting forth the disclosure of a capsule machine in accordance with our invention which has given highly satisfactory results in actual practice for the purpose of simplicity we have illustrated the machine with a single nozzle for producing a single ingredient filled capsule tho it will be readily understood that two nozzles or a multiplicity of nozzles may be simultaneously operated in accordance with the present method so as to produce a plurality of capsules to be dropped simultaneously, in spaced relationship or as combined pairs so as to unite into a single capsule containing different separated ingredients, such capsule or capsules to be deposited in cylindrical containers, singly or lineally spaced in the cylinder in the cooling receiving chamber of the machine which subject matter is to be specifically set forth and covered in an application about to be filed. The machine is operable with single or double ingredient nozzles as disclosed in our earlier application herein before referred to and the operation of the machine is the same except for improvements herein set forth.

Referring to the drawings, in general the apparatus includes a base 20 in which a refrigerating unit is housed, a receiving cooling chamber or tank 21 supported thereon which in turn supports a filling ingredient tank 22 and a capsule material tank 23. Pumps 24 and 25 supply the filling ingredients and capsule material respectively thru pipes 26 and 27 to a capsule nozzle 28 above receiving chamber 21. An electric power drive motor 29 is mounted on framework 30 supported above receiving chamber or tank 21 and has a belt drive 31 with a reduction gear transmission 32 mounted on a cover 33 for the rear portion of tank 21 immediately under motor 29.

One end of the reduced speed driving shaft 34 of transmission 32 has a chain driving gear 35 thereon for driving a positive drive chain 36 between gear 35 and a driven gear 37 on the pump operating drive shaft 38 journaled adjacent to the end of framework 30 over the filling ingredient and capsule material tanks 22 and 23 with tubular spacer elements 39 on the shaft between and outside of bearings 40. Gear 37 and a crank hub 41 are adjustably mounted on opposite ends of shaft 38 by means of set screws 42 so that their cyclic periods may be shifted with respect to each other and both gear 37 and hub 41 are each provided with a plurality of threaded apertures 43 spirally arranged around the outer faces of these members to be selectively engaged by crank pins 44 which operate pump driving linkages 45 of pumps 24 and 25. By this mechanism both the pump capacities and their cyclic periods may be individually adjusted with respect to each other for varying the quantities of the filler ingredient and capsule material with respect to each other and the period of delivery in the formation of capsules as indicated in an enlarged view in Fig. 7. As shown the filling ingredient is introduced laterally into nozzle 28 thru a tube 46 in the side thereof and into the capsule material, one capsule 47 having just dropped therefrom and another in the nozzle being in an initial state of formation.

The apparatus thus far generally described is substantially the same as disclosed in our earlier filed application functioning in the same manner tho of an improved modified formation except that the capsule forming nozzle 28 and associated parts are mounted so as to remain in a relatively fixed position with respect to the cooling receiver instead of intermittently moving the nozzle about over the surface of the liquid coolant as in the apparatus illustrated in the earlier application.

Figure 4:
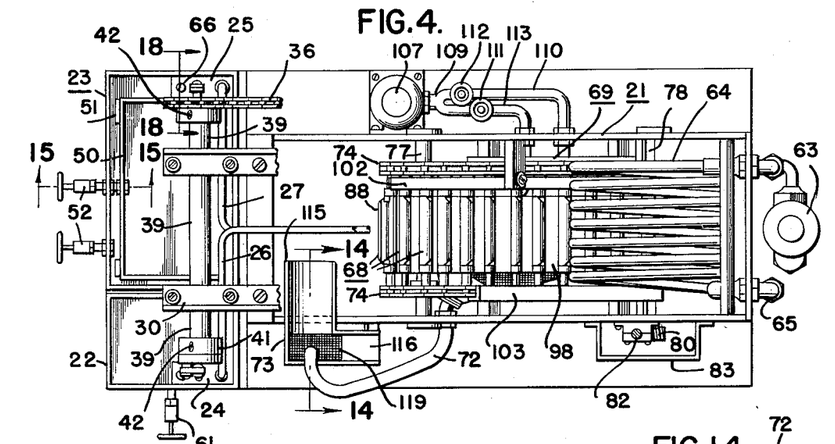
Fig. 4 is a horizontal sectional view thereof taken on line 4—4 of Fig. 1.
Figures 5, 6, 16, 17, 18:
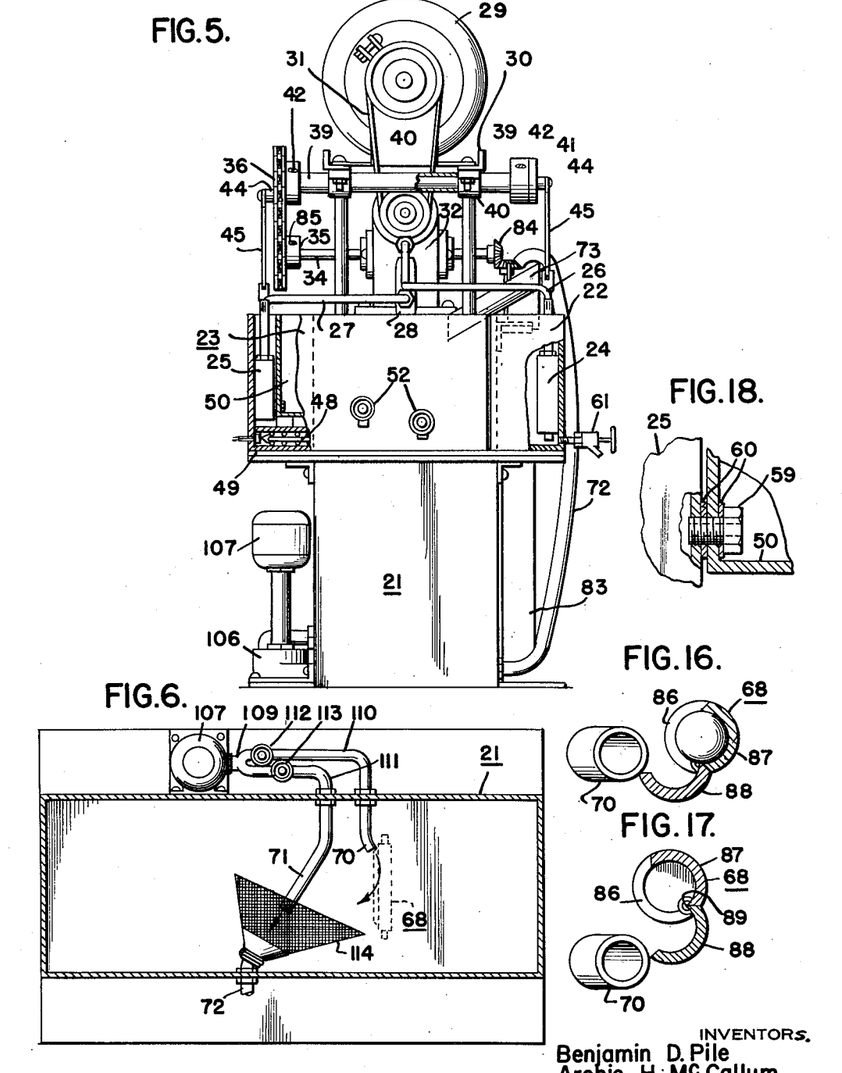
Fig. 5 is an end elevation thereof with parts broken away.
Fig. 6 is a horizontal sectional view taken substantially on line 6—6 of Fig. 3 parts not being shown but a capsule carrying cylinder in cooperating position with respect to a capsule removing fluid nozzle being illustrated in broken lines.
Figs. 16 and 17 are enlarged detail elevations illustrating the coaction of the end of the capsule removing fluid nozzle with a capsule carrying cylinder illustrated partly in vertical section in two positions during the advancement of the conveyor.
Fig. 18 is an enlarged elevational detail view taken on line 18—18 of Fig. 4.
Figure 13:
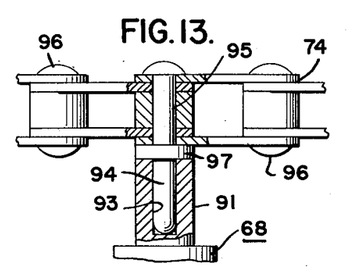
Fig. 13 is an enlarged fragmentary plan view partly in horizontal section illustrating the manner of mounting of the ends of the capsule carrying cylinders in the conveyor belt.
Figure 15:
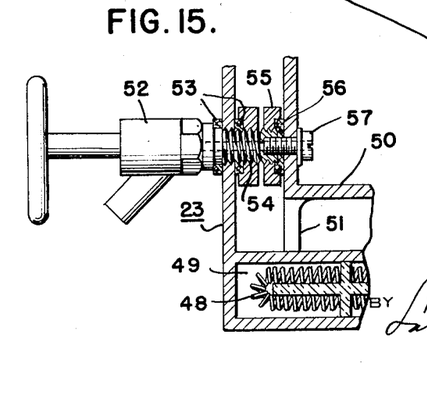
Fig. 15 is an enlarged fragmentary sectional view taken on line 15—15 of Fig. 4.

As in the earlier case, the capsule material tank 23 is heated by means of an electric heating element 48 in the cavity 49 in the base thereof as shown in Fig. 15. The material itself is in an inner removable tank 50 having feet 51 to support it above the bottom of tank 23 thereby providing a water jacket space surrounding the sides and bottom of the tank 50. Both the water jacket and capsule material tank 50 are provided with drain cocks 52 as shown in Fig. 4 secured thru in the side wall adjacent to the bottom of tank 23, employing gaskets 53 and nuts to provide fluid tight connections therewith as best shown in Fig. 15. The drain cock connection for tank 50 includes a relatively longer hollow threaded stem 54 for supporting a nut 55 and gasket 56 for engaging the outer wall of tank 50 and a hollow screw 57 extending thru a gasket 58 and an aperture in tank 50 provide for a fluid tight sealed connection for the drain cock therewith. As shown in Fig. 18 pump 25 likewise has a fluid tight detachable connection with tank 50 comprising a hollow pump inlet screw 59 with gaskets 60 thereon engaging the inner and outer sides of tank 50. Filler ingredient tank 22 likewise is provided with a drain cock 61 as shown in Figs. 13 and 5.

In the present case the refrigerator unit in base 20 is shown having a supply pipe 62 leading upward thru an expansion valve 63 into a cooling coil 64 within the receiving chamber 21 instead of surrounding it as in the earlier case, as in the present case the coolant fluid is in the state of continuous flow as will appear hereinafter. The outlet of cooling coil 64 is connected with a return pipe 65 to the refrigerating unit. The thermostatic control for maintaining the coolant fluid at 60° F. or any other desired higher or lower temperature is of conventional type and not illustrated in the drawings.

As in said earlier application pumps 24 and 25 are of the same general type as shown and described therein and are provided with plugs 66 which may be opened for eliminating air entrapped in the pumps and capsule forming nozzle 28 is provided with an air bleeding plug 67.

Figures 7, 14:
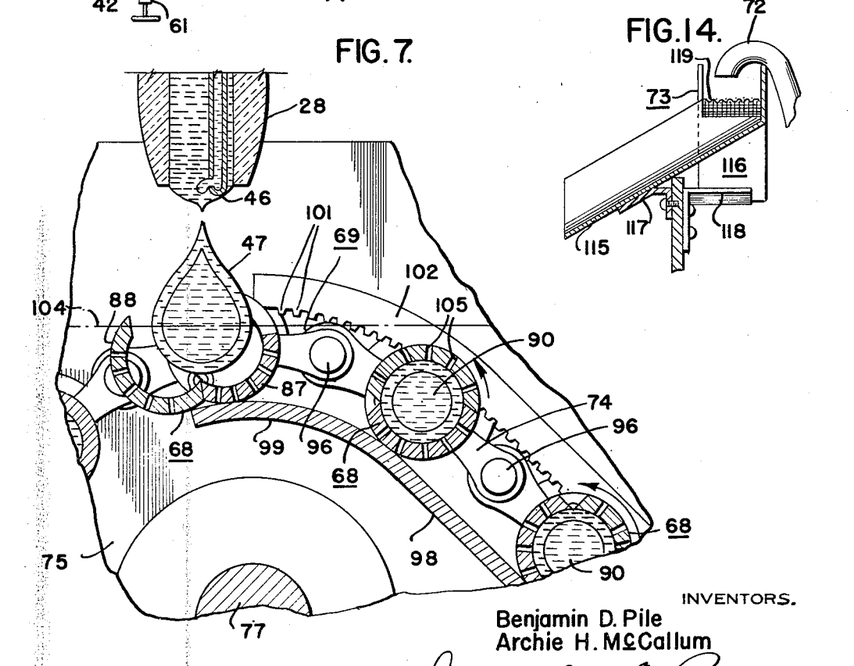
Fig. 7 is an enlarged fragmentary vertical sectional view thru the lower end of the capsule nozzle illustrating its relationship with respect to constructional details of the conveying mechanism.
Fig. 14 is an enlarged fragmentary sectional view taken on line 14—14 of Fig. 4.

In accordance with the present invention it is not essential to adjust the specific gravities of the coolant fluid and capsules with the degree of precision defined in our earlier application. In the apparatus disclosed herein, as the capsules are dropped from nozzle 28 they are received in cylinders 68 carried by an endless conveyor 69 as best shown in Fig. 7. When the capsule is pocketed in the cylinder, being hot, it almost immediately changes its shape, the cylinder is closed around it and the conveyor carries the cylinder and enclosed capsule downwardly in the coolant fluid and it is rotated as it travels downwardly. Adjacent to the bottom of the receiving tank the cylinder opens and the chilled capsule is ejected therefrom by a jet of the coolant fluid directed into the open cylinder from a nozzle 70 as shown in Fig. 6 and the delivery of the chilled capsule is accomplished by means of a jet of the coolant fluid from a nozzle 71 causing it to flow upwardly thru a delivery pipe 72 to a separator 73 at the top of tank 21. The equipment for accomplishing this process will now be described in detail.

Figure 1:
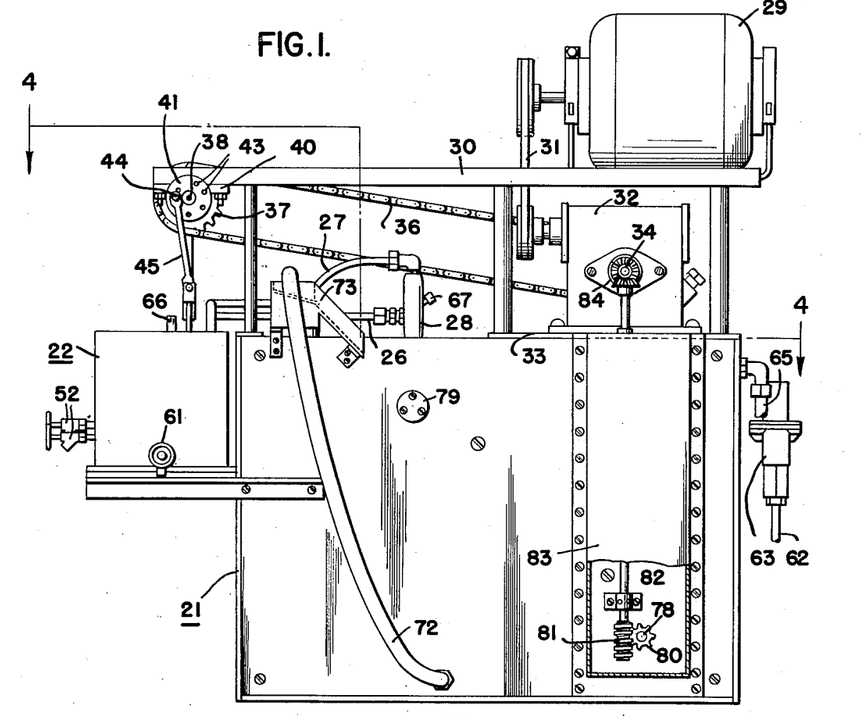
Fig. 1 is a side elevation, partly broken away, of a capsule machine in accordance with our invention.
Figure 2:
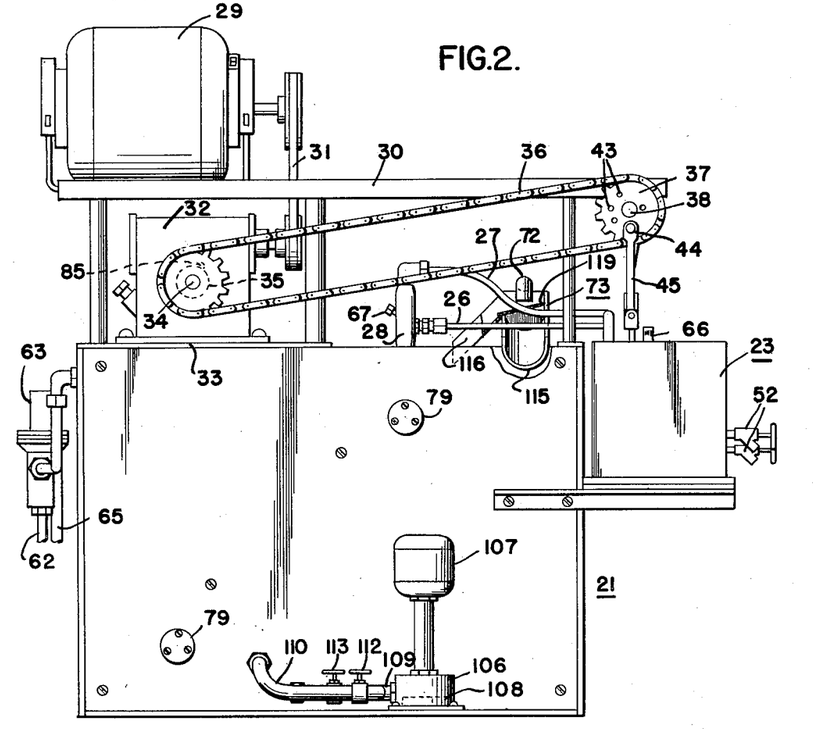
Fig. 2 is a similar reverse side elevation thereof.
Figure 3:
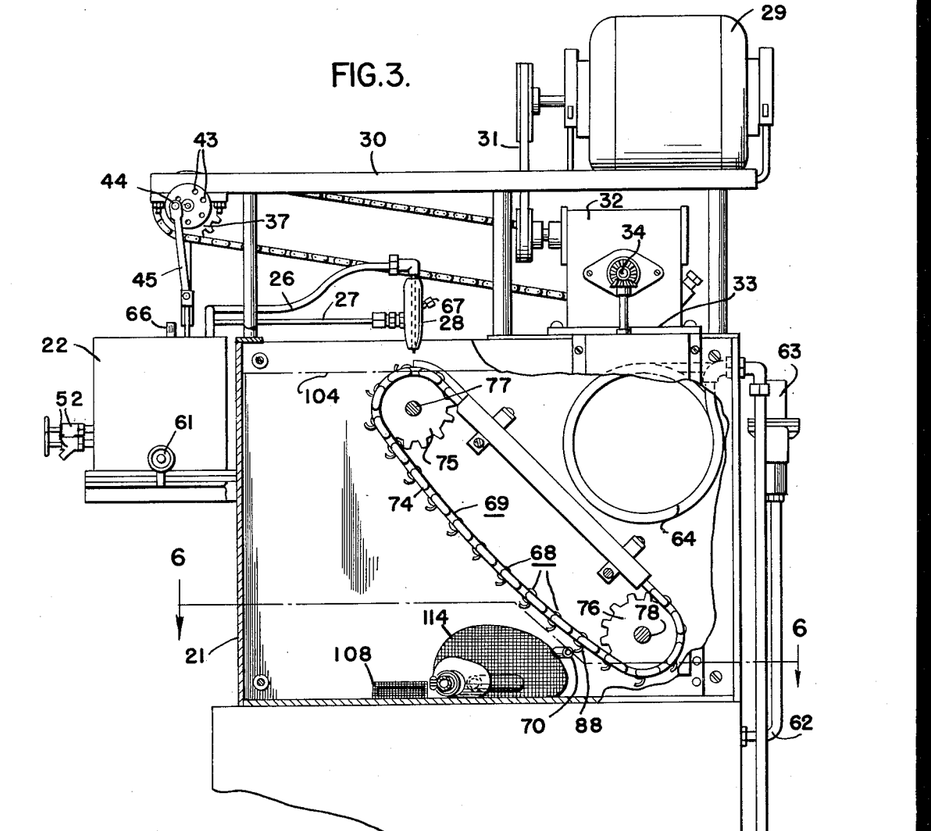
Fig. 3 is a side elevation thereof similar to Fig. 1 with parts broken away further to illustrate further details and further illustrating the base refrigeration compartment.

As best shown in Figs. 3, 4 and 7 endless conveyor 69 includes a pair of spaced sprocket chains 74 entrained over pairs of sprockets 75 and 76 mounted on upper and lower transverse shafts 77 and 78 respectively. These shafts 77 and 78 are journaled in the opposite side walls of receiving tank 21 and as shown in Figs. 1 and 2 the ends of upper shaft 77 and one end of shaft 78 is provided with covers or cap bearings 79 secured to the outer walls of the tank so as to fix their operating positions in the tank and prevent leakage. As shown in Fig. 1 the other end of lower shaft 78 is provided with a worm wheel 80 which is engaged by a driving worm 81 on a vertical shaft 82 extending upwardly thru a fluid tight casing 83 on the side of tank 21 and having bevel gear drive connection 84 with the other end of low speed shaft 34 of the speed reduction transmission 32. This driving transmission for endless conveyor 69 is of the required speed with respect to the operation of pumps 24 and 25 for forming the capsules by nozzle 28, so that the movement of the belts 74 carrying capsule receiving cylinders 68 is timed for moving one cylinder in place to the next cylinder in place between the dropping of the capsules from the nozzle 28. Of course the cyclic relation of the dropping of the capsules and position of the cylinders 68 under the nozzle 28 has to be in phase; accordingly gears in the drive between the low speed transmission shaft 34 and lower conveyor shaft 78 may be secured by releasable set screws the same as set screws 41 or the gear 35 for driving the pump shaft may have such a set screw 85 as shown in dotted lines in Fig. 2. Such arrangement of releasable set screws between the low speed drive shaft 34 and the pumps and the conveyor provide suitable means whereby their cyclic adjustment with respect to each other may be obtained.

Figures 8, 9, 10:
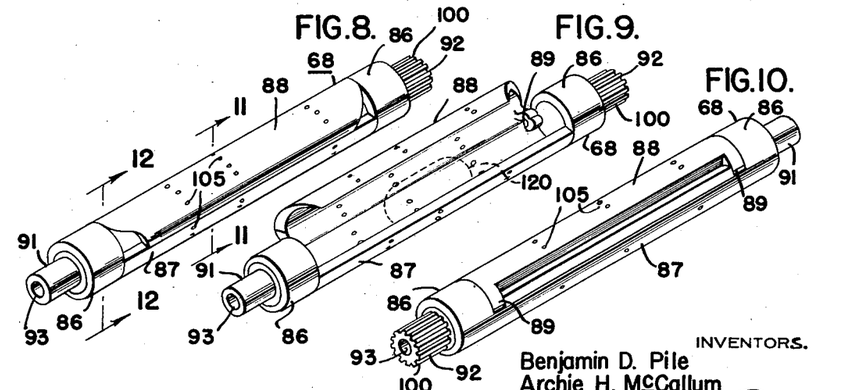
Figs. 8, 9 and 10 are enlarged perspective views of capsule carrying cylinders of the conveyor.
Figure 11:
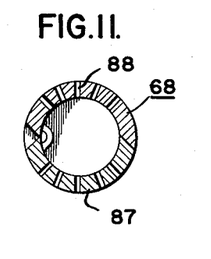
Figs. 11 and 12 are transverse sectional views taken on lines 11—11 and 12—12 respectively of Fig. 8.
Figure 12:
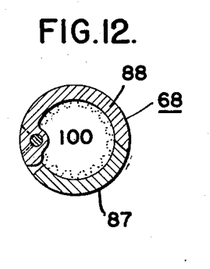

The details of capsule carrying cylinders 68 carried by endless conveyor 69 are best illustrated in Figs. 7 to 13, 16 and 17. The cylinders comprise hollow cylindrical end portions 86 having an intermediate portion 87 integral with these end portions and a hinged portion 88 having hinge elements 89 connecting it with end portions 86 so that it can swing from an open position as shown in Fig. 9 to a closed position as shown in Figs. 8 and 10 when the parts cooperate to form a completed cylinder for encasing a capsule 90 as indicated in Fig. 7. The end portions encase bearing hubs 91 and 92 each having a concentric bore 93 providing a bearing for engaging ends 94 of pins 95 which provide pivot elements for ends of links of the sprocket chains 74 as shown in Fig. 13, noting, as also shown in Fig. 7, alternate chain pivot elements 96 are short as of the usual type, and pivot elements 95 are maintained in place by means of collars 97 shrunk or otherwise secured thereon, thereby holding the ends 94 in proper position for cooperation with cylinders 68. The spacing of these pivot elements 95 as alternate pivots 96 in the sprocket chain provides sufficient space between the cylinders 68 so that their hinged elements 88 may swing open freely without interference with adjacent cylinders and also for a suitable drive speed for the conveyor, in synchronism with the productions of capsule masses at nozzle 28.

As shown in Figs. 4 and 7 a guide plate 98 with a curved upper end 99 is supported under the upper downwardly moving conveyor run so that as the cylinder members 68 reach their uppermost position they will ride over the curved end 99 and engage the plate 98 during their descent with the conveyor belts. It will be noted that the bearing hubs 93 of the cylinders are formed with external gear teeth 100 which are engageable with teeth 101 of a rack member 102 supported over a down run of one of the sprocket chains beyond the upper end of plate 98 as shown in Fig. 7. In this Fig. 7 it will be seen that immediately after the capsule 47 drops into cylinder 68, with the conveyor belts moving in a clockwise direction, the gear teeth 100 on the cylinder hub 93 come into engagement with rack gear teeth 101 so as to produce a counterclockwise rotation of the cylinder and capsule enveloped therein as indicated by the arrows, as the cylinder is moved along the downward stretch. During the interval of the initial movement of the cylinder toward rack 102 the hinged cover begins to close in its cooperation with the curved upper end 99 of guide plate 98 and cooperation of the parts maintain this cover closed while the cylinder in being rotated. The plain hub 91 at the opposite end of cylinder 68 is engaged by a cooperating guide bar 103 extending over at least a portion of the downward run of the other sprocket chain belt member.

As shown by the broken line 104, Figs. 3 and 7, the coolant fluid level is just below the tops of the cylinders 68 in their uppermost positions, down about a quarter of the diameter below the top of the internal diameter of the cylinders which affords sufficient coolant so that as the capsule is deposited in the cylinder, it will take form sufficiently to allow closing of the hinged cover. The cylinder is provided with radial openings 105 in any desired group formations so that any entrapped air in the cylinders will escape as the cylinder is immersed in the coolant fluid. As the cylinders are rotated on their descent, the centrifugal force imparted to the enveloped capsule will influence its shape while it is being chilled. By the time the cylinder reaches the bottom of the stretch, the capsule is sufficiently formed and chilled and the hinged cover 88 of the cylinder swings open by gravity and hangs downwardly as shown in Figs. 3, 16 and 17, so that the capsule may drop out or be removed from the cylinder.

In case of the larger capsules which may be produced, the skin effect of the fluid between them and the cylinder walls is such as to offer resistance to the capsule falling out. In case of such sticking a jet of the cooling fluid from a nozzle 70 helps wash them out as shown in Fig. 6. Also, as shown in Figs. 3, 16 and 17, as the cylinder passes the nozzle 70 the edge of the cylinder cover engages the end of the nozzle, in effect tapping and tilting the cylinder so that together with the jet fluid flow, removal of the capsule is assured.

This flow of coolant fluid thru nozzle 70 (and nozzle 71), is produced by a centrifugal pump 106 operated by a motor 107 at the side of tank 21 and having a screened inlet opening 108 communicating therewith adjacent to the bottom of the tank. The outlet 109 of pump 106 communicates thru pipes 110 and 111 with nozzles 70 and 71 respectively and the control of fluid to these nozzles is individually controlled by valves 112 and 113, respectively, in said pipes.

Flow of the coolant from nozzle 71 directs the capsules into a screened funnel 114 and they are carried with the fluid up thru pipe 72 to separator 73 into which they fall from the upper end of pipe 72. As shown in detail in Figs. 2, 4 and 14 separator 73 comprises two inclined troughs 115 and 116, at right angles to each other suitably supported by brackets 117 and 118 on an upper side edge of tank 21 so that trough 115 is directed into the receiver and trough 116 extends entirely outside thereof. An inclined wire mesh or screen 119 covers the upper end of trough 115 and forms the upper end of the external trough 116 so that capsules falling thereon from pipe 72 will pass thru trough 116 and from there fall into a suitable container, and the fluid will pass thru the screen, into trough 115 for return to the coolant capsule receiver tank 21. In this way it will be seen that the coolant is maintained in constant circulation within the receiver and uniformity of temperature will be maintained even tho the refrigerating coil 64 may be in a more or less concentrated area in the tank.

Figure 19:
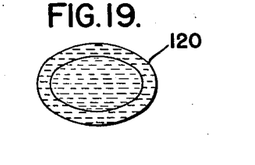
Fig. 19 is an enlarged sectional view along the major axis of a finished oval capsule produced by our improved capsule machine and process.

It will be seen in view of the foregoing that the apparatus is adapted for producing capsules of various sizes, spherical in form and of larger sizes ellipsoidal in shape 120, indicated in dotted lines in Fig. 9, which when chilled and dried in final form for packages assumes the shape illustrated in Fig. 19. The variation in size of course is controlled in accordance with the amount of filler ingredient and capsule material fed to nozzle 28.

We claim:

1. A capsule forming machine including, a nozzle with means for supplying capsule shell forming material and a filler material therein so as to be dropped therefrom as filled capsules at regular intervals, a cooling chamber below said nozzle for containing a cooling fluid, endless conveyor means extending downwardly into the chamber from an upper position and having enclosing receptacles in which shaping of capsules takes place for receiving the capsules as they are dropped from the nozzle, and means for moving said conveyor for carrying the capsules downwardly from the upper position where they are received to a point adjacent to the bottom of the chamber.

2. A capsule forming machine including, a nozzle with means for supplying capsule shell forming material with a filler material therein so as to be dropped therefrom as filled capsules at regular intervals, a cooling chamber below said nozzle, a cooling fluid in said chamber, an endless conveyor means extending downwardly into the chamber from an upper position substantially at the surface of the cooling fluid and having enclosing receptacles in which shaping of capsules takes place for receiving the capsules as they are dropped from the nozzle, and means conveyor means extending downwardly into the for moving said conveyor for carrying the capsules downwardly in the cooling fluid in the chamber.

3. A capsule forming machine including, a nozzle with means for supplying capsule shell forming material and a filler material therein so as to be dropped therefrom as filled capsules at regular intervals, a cooling chamber below said nozzle for containing a cooling fluid, endless conveyor means extending downwardly into the chamber from an upper position for receiving the capsules as they are dropped from the nozzle, and means for moving said conveyor for carrying the capsules downwardly in the cooling fluid in the chamber, and means for ejecting the capsules from the conveyor as they arrive at a point adjacent to the bottom of the chamber.

4. A capsule forming machine including, a nozzle with means for supplying capsule shell forming material and a filler material therein so as to be dropped therefrom as filled capsules at regular intervals, a cooling chamber below said nozzle, a cooling fluid in said chamber, endless conveyor means extending downwardly into the chamber from an upper position substantially at the surface of the cooling fluid for receiving the capsules as they are dropped from the nozzle, and means for moving said conveyor for carrying the capsules downwardly in the cooling fluid in the chamber, and means for ejecting the capsules from the conveyor as they arrive at a point adjacent to the bottom of the chamber.

5. A capsule forming machine including, a nozzle with means for supplying capsule shell forming material and a filler material therein so as to be dropped therefrom as filled capsules at regular intervals, a cooling chamber below said nozzle, a cooling fluid in said chamber, endless conveyor means extending downwardly into the chamber from an upper position substantially at the surface of the cooling fluid for receiving the capsules as they are dropped from the nozzle and carrying the capsules downwardly into the chamber, and means for ejecting the capsules from the conveyor adjacent to the bottom position thereof comprising a stream of the cooling fluid directed toward the conveyor so as to eject the capsules therefrom and move them to a position for removal from the chamber.

6. A capsule forming machine including, a nozzle with means for supplying capsule shell forming material and a filler material therein so as to be dropped therefrom as filled capsules at regular intervals, a cooling chamber below said nozzle, a cooling fluid in said chamber, endless conveyor means extending downwardly into the chamber from an upper position substantially at the surface of the cooling fluid, horizontal cylindrical containers carried by the conveyor each having an open side with a closure cover therefor hinged along a side edge of the opening, and means for presenting the containers with their covers in open position successively under the nozzle for receiving the capsules as they are dropped from the nozzle and for closing the containers with the capsules therein and permitting the container covers to swing open adjacent to the bottom of the chamber.

7. A capsule forming machine including, a nozzle with means for supplying capsule shell forming material and a filler material therein so as to be dropped therefrom as filled capsules at regular intervals, a cooling chamber below said nozzle, a cooling fluid in said chamber, endless chamber from an upper position substantially at the surface of the cooling fluid, horizontal cylindrical containers carried by the conveyor each having an open side with a closure therefor hinged along a side edge of the opening, means for presenting the containers with their covers in open position successively under the nozzle for receiving the capsules as they are dropped from the nozzle and for closing the containers with the capsules therein and carrying the capsules downwardly into the chamber, and means for rotating each container about its cylindrical axis as it is carried downwardly into the chamber by the conveyor, and for permitting the container closure to swing open adjacent to the bottom of the conveyor.

8. A machine for forming filled flexible capsules, including a capsule forming and filling nozzle; a cooling chamber with a liquid coolant therein; means for receiving and carrying capsules formed by the nozzle downwardly thru the liquid coolant in the cooling chamber, comprising an endless conveyor extending downwardly from a position adjacent to the surface of the liquid coolant and under the nozzle to a desired depth in the liquid coolant, containers at spaced intervals along said endless conveyor, and means for moving the conveyor so as to carry the capsule containers downwardly into the liquid coolant; and means for operating the capsule forming nozzle at intervals so that formed capsules will be dropped into each of the containers carried by the conveyor as it passes under the nozzle.

9. A machine for forming filled flexible capsules, including a capsule forming and filling nozzle; a cooling chamber with a liquid coolant therein; means for receiving and carrying capsules formed by the nozzle downwardly thru the liquid coolant in the cooling chamber, comprising an endless conveyor extending downwardly from a position adjacent to the surface of the liquid coolant and under the nozzle to a desired depth in the liquid coolant, and containers at spaced intervals along said endless conveyor; means for moving the endless conveyor and operating the capsule forming nozzle at intervals so that formed capsules will be dropped into each of the containers carried by the conveyor as it passes under the nozzle; means for rotating the containers with formed capsules therein as they travel downwardly into the coolant liquid; and means for ejecting the capsules from the containers adjacent to their lowermost position.

10. A machine for forming filled flexible capsules including, a capsule forming and filling nozzle, a cooling chamber with a liquid coolant therein, means for receiving and carrying capsules formed by the nozzle downwardly thru the liquid coolant in the cooling chamber, comprising an endless conveyor extending downwardly from a position adjacent to the surface of the liquid coolant and under the nozzle to a desired depth in the liquid coolant, and containers constructed and arranged to open and close, disposed at spaced intervals along said endless conveyor; means for moving the endless conveyor and operating the capsule forming nozzle at intervals so that formed capsules will be dropped into each of the containers carried by the conveyor as it passes under the nozzle in an open condition; means for closing the containers after the capsules are deposited therein and permitting them to subsequently open; means for rotating the containers with formed capsules therein as they travel downwardly into the coolant; and means for ejecting the capsules therefrom at the lower portion of the cooling chamber.

11. A machine for forming filled flexible capsules including, a capsule forming and filling nozzle, a cooling chamber with a liquid coolant therein; means for receiving and carrying capsules formed by the nozzle downwardly thru the liquid coolant in the cooling chamber, comprising an endless conveyor extending downwardly from a position adjacent to the surface of the liquid coolant and under the nozzle to a desired depth in the liquid coolant, and containers constructed and arranged to open and close, disposed at spaced intervals along said endless conveyor; means for moving the endless conveyor and operating the capsule forming nozzle at intervals so that formed capsules will be dropped into each of the containers carried by the conveyor as it passes under the nozzle in an open condition; means for closing the containers after the capsules are deposited therein and permitting them to subsequently open; means for rotating the travel downwardly into the coolant liquid; a nozzle adjacent to said opened containers; and means for passing a stream of the coolant fluid thru said nozzle directed toward the interior of the containers for ejecting capsules therefrom as the containers pass the nozzle.

12. A machine for forming filled flexible capsules including, a capsule forming and filling nozzle, a cooling chamber with a liquid coolant therein; means for receiving and carrying capsules formed by the nozzle downwardly thru the liquid coolant in the cooling chamber, comprising an endless conveyor extending downwardly from a position adjacent to the surface of the liquid coolant and under the nozzle to a desired depth in the liquid coolant, and containers constructed and arranged to open and close, disposed at spaced intervals along said endless conveyor; means for moving the endless conveyor and operating the capsule forming nozzle at intervals so that formed capsules will be dropped into each of the containers carried by the conveyor as it passes under the nozzle in an open condition; means for closing the containers after the capcontainers with formed capsules therein as they sules are deposited therein and permitting them to subsequently open; means for rotating the containers with formed capsules therein as they travel downwardly into the coolant liquid; a nozzle adjacent to said opened containers so as to engage the containers with tapping actions as they pass it to dislodge the capsules; and means for passing a stream of coolant fluid thru said nozzle directed toward the interior of the containers for ejecting capsules therefrom as the containers pass the nozzle.

13. A machine for forming filled flexible capsules including, a capsule forming and filling nozzle, a cooling chamber with a liquid coolant therein; means for receiving and carrying capsules formed by the nozzle downwardly thru the liquid coolant in the cooling chamber, comprising an endless conveyor extending downwardly from a position adjacent to the surface of the liquid coolant and under the nozzle to a desired depth in the liquid coolant, and container constructed and arranged to open and close, disposed at spaced intervals along said endless conveyor; means for moving the endless conveyor and operating the capsule forming nozzle at intervals so that formed capsules will be dropped into each of the containers carried by the conveyor as it passes under the nozzle in an open condition; means for closing the containers after the capsules are deposited therein and permitting them to subsequently open; means for rotating the containers with formed capsules therein as they travel downwardly into the coolant liquid; and a projecting element in the lower portion of the cooling chamber in a position to enage the containers with tapping actions as they pass it to dislodge the capsules.

14. A machine for forming filled flexible capsules including, a capsule forming and filling nozzle, a cooling chamber with a liquid coolant therein; means for receiving and carrying capsules formed by the nozzle downwardly thru the liquid coolant in the cooling chamber, comprising an endless conveyor extending downwardly from a position adjacent to the surface of the liquid coolant and under the nozzle to a desired depth in the liquid coolant, and container constructed and arranged to open and close, disposed at spaced intervals along said endless conveyor; means for moving the endless conveyor and operating the capsule forming nozzle at intervals so that formed capsules will be dropped into each of the containers carried by the conveyor as it passes under the nozzle in an open condition; means for closing the containers after the capsules are deposited therein and permitting them to subsequently open; means for rotating the containers with formed capsules therein as they travel downwardly into the coolant liquid; a nozzle adjacent to said opened containers, a second nozzle adjacent to the bottom of the chamber, a collecting funnel in the path of said second nozzle, a conveyor pipe communicating with said collecting funnel and extending upward to a point above the chamber, a separator on the chamber for directing fluid from said pipe into the top of the chamber and capsules to the outside thereof, and a fluid pump having an intake communicating with the lower portion of said chamber and its outlet connected with said two nozzles whereby the stream of coolant fluid from the first nozzle will eject capsules from the containers as the containers pass the same and the stream of fluid from the second nozzle will effect a flow of the coolant and capsules up thru said conveyor pipe to the separator.

15. A machine for forming filled flexible capsules including, a capsule forming and filling nozzle, a cooling chamber with a liquid coolant therein; means for receiving and carrying capsules formed by the nozzle downwardly thru the liquid coolant in the cooling chamber, comprising an endless conveyor extending downwardly from a position adjacent to the surface of the liquid coolant and under the nozzle to a desired depth in the liquid coolant, and container constructed and arranged to open and close, disposed at spaced intervals along said endless conveyor; means for moving the endless conveyor and operating the capsule forming nozzle at intervals so that formed capsules will be dropped into each of the containers carried by the conveyor as it passes under the nozzle in an open condition; means for closing the containers after the capsules are deposited therein and permitting them to subsequently open; means for rotating the containers with formed capsules therein as they travel downwardly into the coolant liquid; a nozzle adjacent to said opened containers, a second nozzle adjacent to the bottom of the chamber, a collecting funnel in the path of said second nozzle, a conveyor pipe communicating with said collecting funnel and extending upward to a point above the chamber, a separator on the chamber for directing fluid from said pipe into the top of the chamber and capsules to the outside thereof, a fluid pump having an intake communicating with the lower portion of said chamber and its outlet connected with said two nozzles whereby the stream of coolant fluid from the first nozzle will eject capsules from the containers as the containers pass the same and the stream of fluid from the second nozzle will effect a flow of the coolant and capsules up thru said conveyor pipe to the separator and individual control valves for controlling the flow thru said nozzles.

16. In the process of forming filled capsules, the steps which consist in ejecting a filled capsule of capsule forming material with a filling ingredient enveloped therein, while in a relatively hot state, into a liquid coolant, carrying the capsule downwardly and simultaneously rotating the capsule in said coolant until it is chilled to substantially the temperature of the coolant.

17. In the process of forming filled capsules, the steps which consist in ejecting filled capsules of capsule forming material with a filling ingredient enveloped therein, while in a relatively hot state, into a liquid coolant, encasing the capsule in a shaping member as it strikes the coolant, and rotating the shaping member and capsule in said coolant until it is chilled to substantially the temperature of the coolant.

18. In the process of forming filled capsules, the steps which consist in ejecting filled capsules of capsule forming material with a filling ingredient enveloped therein, while in a relatively hot state, into a liquid coolant, encasing the capsule in a shaping member as it strikes the coolant, rotating the shaping member and capsule in said coolant, and releasing the capsule from said shaping member following a period of rotation therein.

19. In the process of forming filled capsules, the steps which consist in ejecting filled capsules of capsule forming material with a filling ingredient enveloped therein, while in a relatively hot state, into a liquid coolant, encasing the capsule in a shaping member as it strikes the coolant, rotating the shaping member and capsule in said coolant, releasing the capsule from said shaping member following a period of rotation therein, and conveying the capsule in a stream of the coolant liquid to a separator.

20. In the process of forming filled capsules, the steps which consist in ejecting filled capsules of capsule forming material with a filling material enveloped therein, while in a relatively hot state, into a receiving chamber containing a liquid coolant, maintaining the coolant in constant circulation with a downward movement in the chamber, carrying the capsules downwardly and rotating them during their descent in the receiving chamber, and utilizing upward movement of the circulating coolant fluid outside of the chamber to elevate chilled capsules to a separating device.

BENJAMIN D. PILE.
ARCHIE H. McCALLUM.

REFERENCES CITED

The following references are of record in the file of this patent:

UNITED STATES PATENTS

| Number | Name | Date |
| --- | --- | --- |
| 2,152,101 | Scherer | Mar. 28, 1939 |
| 2,339,114 | Scherer | Jan. 11, 1944 |
| 2,379,817 | Mabbs | July 3, 1945 |

Certificate of Correction

Patent No. 2,529,416                                                                 November 7, 1950

BENJAMIN D. PILE ET AL.

It is hereby certified that error appears in the printed specification of the above numbered patent requiring correction as follows:

Column 7, line 74, strike out the words "conveyor means extending downwardly into the" and insert the same after the word "endless" in column 8, line 73; column 10, line 47, strike out "containers with formed capsules therein as they" and insert the same before "travel", line 23, same column;

and that the said Letters Patent should be read as corrected above, so that the same may conform to the record of the case in the Patent Office.

Signed and sealed this 9th day of January, A. D. 1951.

[SEAL]

THOMAS F. MURPHY,
*Assistant Commissioner of Patents.*